United States Patent
Sievers et al.

[11] 3,893,775
[45] July 8, 1975

[54] RESILIENT BUSHING WITH LONG FATIGUE LIFE

[75] Inventors: David L. Sievers; Gary L. Hipsher, both of Logansport, Ind.; Robert Vosburgh, Royal Oak, Mich.

[73] Assignee: The General Tire & Rubber Company, Akron, Ohio

[22] Filed: May 13, 1974

[21] Appl. No.: 468,970

[52] U.S. Cl. .................. 403/225; 267/57.1
[51] Int. Cl. ............................. F16b 1/00
[58] Field of Search .......... 403/225, 227, 228, 226; 267/57.1 R, 57.1 A, 152; 29/DIG. 36; 308/26; 51/319, 320, 321

[56] References Cited
UNITED STATES PATENTS

| | | | |
|---|---|---|---|
| 1,610,927 | 12/1926 | Butler | 51/319 |
| 2,341,821 | 2/1944 | Schwinn | 403/228 |
| 3,387,839 | 6/1968 | Miller et al. | 267/57.1 R |

*Primary Examiner*—Andrew V. Kundrat

[57] ABSTRACT

A resilient bushing with long fatigue life comprises an outer rigid member having curvilinear inner surface portions and inner rigid member having curvilinear outer surface portions. At least one of said surface portions has a surface roughness height rating measured by SAE Standard J448a. Said surface roughness height rating is provided by sandblasting said surface portions of a metal member, and thereafter forming on said surface portions a phosphate coating. An elastomeric insert is compressively positioned between said inner surface portions of the outer member and said outer surface portions of the inner member.

13 Claims, 5 Drawing Figures

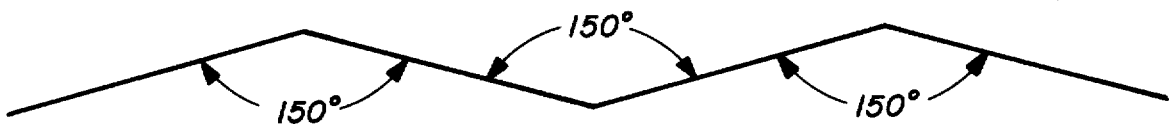
SURFACE PROFILE OF PRECISION
REFERENCE SPECIMEN
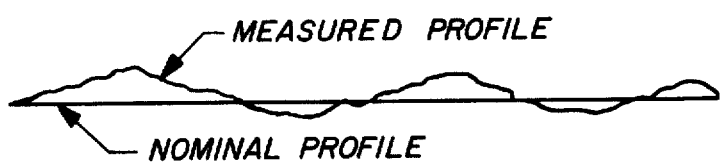
MEASURED PROFILE
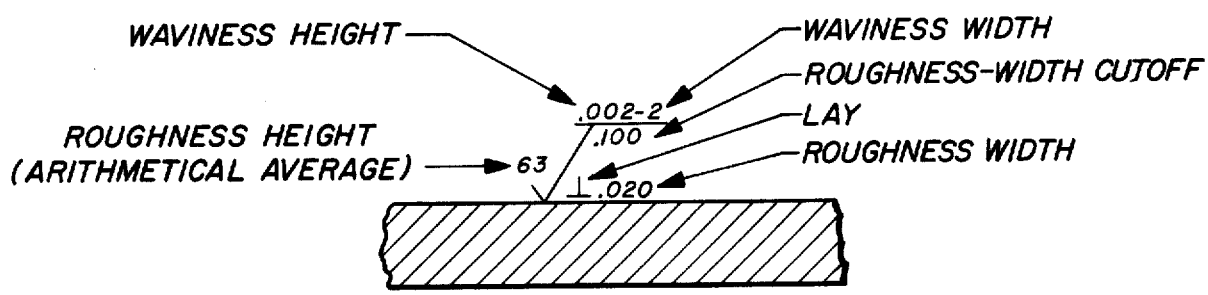
MEANING OF EACH PART
OF SYMBOL DEFINED

RESILIENT BUSHING WITH LONG FATIGUE LIFE

FIELD OF THE INVENTION

The present invention relates to a resilient bushing comprising inner and outer rigid members between which is positioned an elastomeric insert typically under radial compression.

BACKGROUND OF THE INVENTION

In the isolation of vibration between structural components, it has become well known to use a resilient bushing having a pair of concentric rigid, typically metal sleeves. The inner sleeve is secured to one structural component, and the outer sleeve is secured to the other structural component. An annular elastomeric insert is concentrically positioned between the rigid sleeves typically under radial compression. Such resilient bushings are also utilized to increase the dampening of metal structures such as the frames of automobiles, and to interrupt low impedance all-metal paths for the transmission of structure-borne sounds in a metal structure. Illustrative of previously known resilient bushings and machines for making such bushings are those described in U.S. Pat. Nos. 2,749,160, 2,824,362, 2,840,893, 2,844,398, 2,858,155, 2,872,727, 2,877,543, 2,895,215, 3,082,999, 3,147,964, 3,171,699, 3,239,286, 3,380,791, 3,387,839, 3,560,034 and 3,643,320.

Originally these resilient bushings were made by inserting the uncured elastomeric insert between the concentric sleeves and thereafter relieving the internal stresses of the insert during bonding and curing. To increase the load-bearing capacity of the bushings, precured inserts were compressibly inserted between the sleeves. It was also found that various spring rates in different radial directions could be achieved in a single bushing by providing the insert with various recesses.

One of the continuing difficulties with such resilient bushings has been fatigue life. That is, the failure of the bushing after it has flexed a given number of vibrational cycles. Fatigue failure is caused by the relative movement between the rigid members and the elastomeric insert and the resulting wearing away of the elastomeric insert. Thus, extended fatigue life has been possible only where there is no relative movement between the metal sleeves and the elastomeric insert. Compressive insertion of precured elastomeric inserts between the sleeve members has increased fatigue life. However, it still remains common to specify a required fatigue life in terms of a lower number of cycles, e.g. 100 kilocycles, before failure.

Previously, resilient bushings have been made with phosphate coated metal sleeves. Phosphate coatings have been specified for manufacturing purposes. The phosphate coating aided in assembly by holding a lubricant and preventing rust and corrosion of the sleeves after assembly. The coating weight and the corresponding surface roughness of the coating varied with the composition of the phosphate coating bath (e.g. anion, accelerator, etc.), the temperature of the coating bath, and the length of the coating cycle. However, for practical reasons, the phosphate coating utilized has typically been between 700 and 900 milligrams/ft$^2$. Heavy phosphate coatings of greater than 2,000 milligrams/ft$^2$ have been used to aid assembly and provide increased interference fit between the outer member and a control arm, etc., in certain applications. But, the corresponding surface roughness height rating has not exceeded 170 RMS measured by SAE Standard J448a and has not been considered to have lasting effects because of the smoothing of the phosphate coating on assembly and subsequent use.

The present invention extends the fatigue life of resilient bushings by preparation of the surfaces of the rigid members contacting the elastomeric insert. The preparation provides a surface roughness greater than previous bushings by sandblasting to reduce the movement between the rigid members and the elastomeric insert.

SUMMARY OF THE INVENTION

A resilient bushing of the present invention comprises a rigid outer member preferably in the form of a cylindrical sleeve, a rigid inner member preferably in the form of a cylindrical sleeve spaced apart preferably concentrically from the outer member, and an elastomeric insert compressively positioned between said inner and outer rigid members. The outer member has curvilinear inner surface portions of preferably cylindrical shape and the inner member has curvilinear outer surface portions of preferably cylindrical shape.

At least one of said surface portions and most desirably the outer surface portions of the inner member is sandblasted to produce a surface roughness height rating of greater than 170 RMS and less than about 260 RMS measured by SAE Standard J448a. Preferably the roughness height rating of said surface is supplemented by subsequently forming on the surface a phosphate coating of at least 2,000 milligrams per square foot.

Other details, objects and advantages of the invention will become apparent as the following description of the presently preferred embodiments and presently preferred methods of practicing the same proceeds.

BRIEF DESCRIPTION OF THE DRAWINGS

In the accompanying drawings, the preferred embodiments and presently preferred methods for practicing the invention are illustrated, in which:

FIG. 3 corresponds to FIG. 1 of SAE Standard J448a and shows the surface profile of a precision reference specimen;

FIG. 4 corresponds to FIG. 2 of SAE Standard J448a and demonstrates the measured profile of a surface; and FIG. 5 corresponds to FIG. 3 of SAE Standard J448a and shows the meaning of each part of the symbols defined.

DESCRIPTION OF THE PREFERRED EMBODIMENTS

Figure 1:
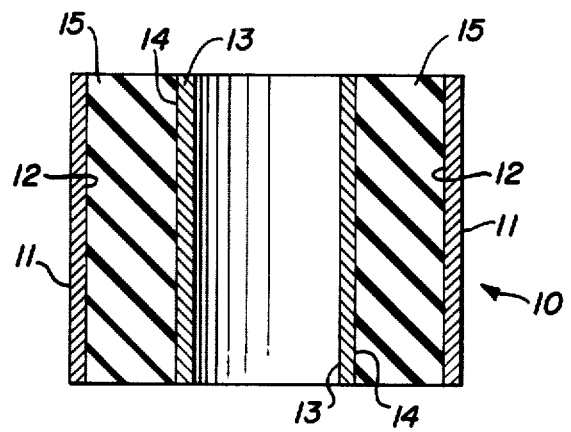
FIG. 1 is an elevational view in cross-section of a resilient bushing embodying the present invention.
Figure 2:
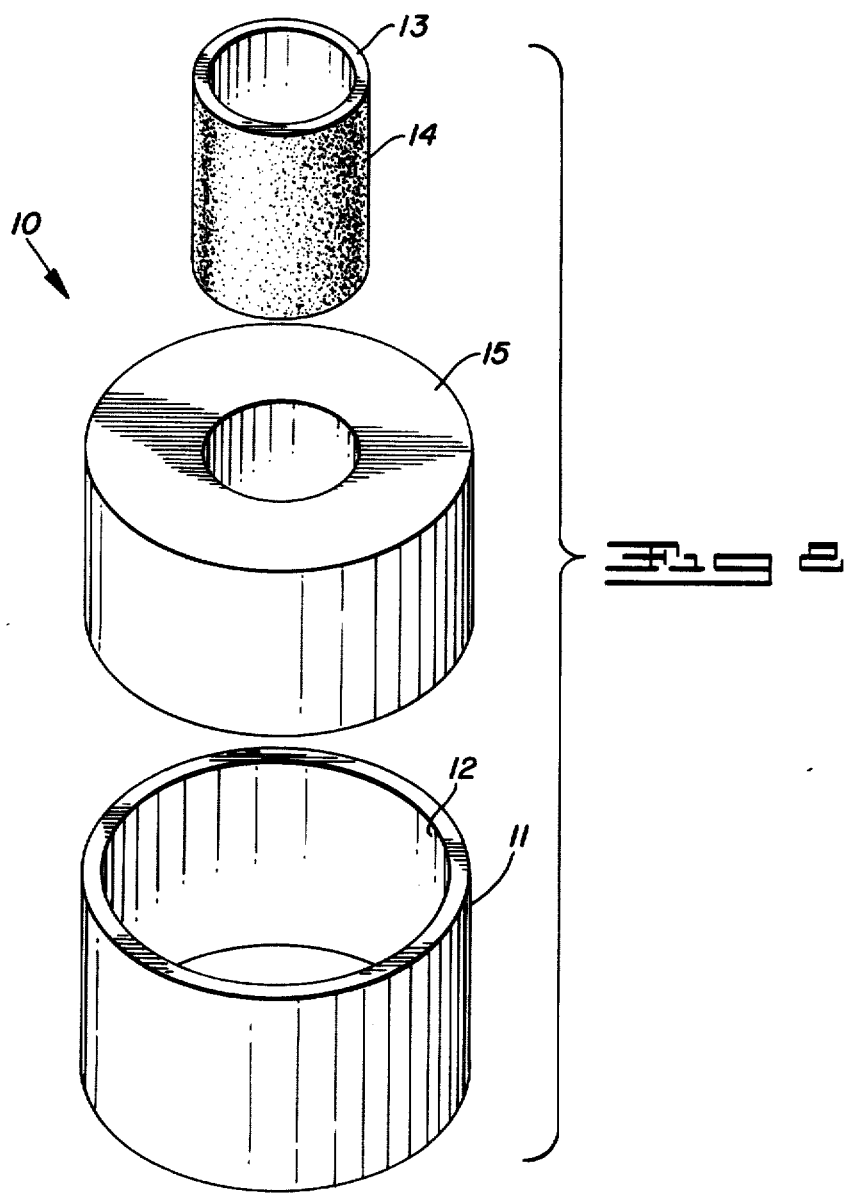
FIG. 2 is an exploded perspective view of the resilient bushing shown in FIG. 1.

Referring to FIGS. 1 and 2, a resilient bushing 10 is shown. Bushing 10 comprises an outer rigid member 11 having a curvilinear inner surface portion 12 and inner rigid member 13 having a curvilinear outer surface portion 14. Preferably members 11 and 13 are made of metal such as steel or aluminum and are cylindrically shaped, and on assembly, are preferably concentrically positioned with respect to each other.

Compressively positioned between members 11 and 13 is elastomeric, preferably annular insert 15. Elastomeric insert 15 can be made, for example, by masterbatching an elastomeric compound with suitable amounts of accelerator, modifier and plasticizing agents as well as curing agents, accelerators, antioxidants and fillers. Suitable elastomeric compounds in addition to natural rubber are synthetic elastomers such as styrene-butadiene rubber, ethylene-propylene rubber and the like, typically filled with carbon black. The masterbatch is injection, transfer or compression molded, and thereafter cured to form the elastomeric insert. The insert typically has a Shore-A hardness of between 35 and 70 Durometer and most desirably of 50 Durometer or greater.

The resilient bushing also includes preparing surface portions 12 and/or 14 with a surface roughness height rating of between 170 RMS and about 260 RMS measured by SAE Standard J448a. That is, either inner surface 12 of outer member 11 or outer surface 14 of inner member 13, or both, is prepared prior to assembly of the resilient bushing with a surface roughness in the range above described. Preferably, as shown, at least outer surface 14 of inner member 13 is provided with said surface roughness because the movement between the inner member 13 and the elastomeric insert 15 is higher, and in turn the wear is higher there than the movement between outer member 11 and elastomeric insert 15.

Surface portions 12 and/or 14 are prepared with the desired surface roughness by sandblasting, and in addition coating said surface portions with a heavy phosphate coating of at least 2,000 milligrams/ft$^2$. The procedures for sandblasting and phosphate coating of metals such as steel are old and well known to those skilled in the art and need not be restated here. The only point which needs repeating is that the sandblasting can be readily controlled to provide the desired lasting surface roughness height rating measured by SAE Standard J448a.

SAE Standard J448a was first approved by the Surface Finish Committee of the SAE in March 1949 and was to applicants' knowledge last revised in June 1963. The Standard states as follows:

1. General Data — This SAE Standard is concerned with the geometrical irregularities of surfaces of solid materials. It establishes definite classifications for various degrees of roughness and waviness and for several varieties of lay. It also provides a set of symbols for use on drawings, and in specifications, reports, and the like. The ranges for roughness and waviness are divided into a number of steps, and the general types of lay are established by type characteristics.

This Standard does not define what degrees of surface roughness and waviness or what type of lay are suitable for any specific purpose. It does not specify the means by which any degree of such irregularities may be obtained or produced. Neither is it concerned with the other surface qualities such as luster, appearance, color, corrosion resistance, wear resistance, hardness, microstructure, and absorption characteristics any of which may be governing considerations in specific applications.

Surfaces, in general, are very complex in character. Although the height, width, length, shape and direction of surface irregularities may all be of practical importance in specific applications, this standard deals only with their height, width, and direction.

2. Precision Reference Specimens — Surface roughness designation by this standard is based on instrument readings of surfaces to be rated in comparison with those of precision reference specimens having known roughness values and having a wide distribution of replicas. Surfaces described in the specifications for these specimens are designed primarily to serve for calibration of instruments used for measuring surface roughness height. They are not intended to have the appearance or characteristics of commonly produced surfaces, nor are they intended for use in visual or tactual comparisons.

Specifications are given for surface contour, material, accuracy, uniformity, and rating that will be satisfactory for the purpose.

2.1 Surface Contour — The normal surface profile of precision reference specimens of roughness height shall consist of a series of isoceles triangles having included angles of 150 deg. Such a profile is shown in FIG. 3.

A departure from this triangular profile is permitted at the bottom of the grooves, provided that the deviated portion does not exceed 0.000130 in. in width and that there shall be no solid material at any point beyond a line corresponding to a flat of this width. This departure shall not affect the portion above this flat, which portion shall meet the allowed tolerance for accuracy.

2.2 Material — The material from which precision reference specimens are made shall be such that repeated measurements on these specimens can be made without significant loss of accuracy.

2.3 Accuracy — Average roughness values of precision reference specimens shall not vary from the designated value by more than ±1Mu in. or ±3%, whichever is the larger. The average spacing of the grooves of precision reference specimens shall be within 2% or 20 Mu in. (whichever is the smaller) of the theoretical spacing corresponding to the nominal roughness height.

2.4 Uniformity — The average deviation of roughness height of individual grooves of any precision reference specimen shall not exceed 4% of the total roughness height. The average deviation of the groove spacings on a given precision reference specimen shall not exceed 3% of the average spacing.

2.5 Rating — Precision reference specimens shall be rated for roughness height and roughness width as provided in the section on Recommended Values of Roughness and Waviness of this Standard. With tracer type instruments having a finite tracer tip radius, it is impossible to bottom the ideally sharp grooves as described for the ideal triangular profile. Accordingly, the proper reading of a tracer type instrument on the precision reference specimens will depend on the tracer tip radius. Ratings of the specimens for checking the calibration of such instruments shall be supplied with the specimens.[1] [[1] See also Appendix C in ASA B46.1-1962.]

3. Definitions — (See FIG. 5.)

3.1 Surface Texture — Repetitive or random deviations from the nominal surface which form the pattern of the surface. Surface texture includes roughness, waviness, lay, and flaws.

3.2 Surface — The surface of an object is the boundary which separates that object from another object, substance, or space. Surfaces with which this standard is concerned shall be those requiring control of roughness or other surface characteristics.

3.2.1 Nominal Surface — Nominal surface is the intended surface contour, the shape and extent of which is usually shown and dimensioned on a drawing or descriptive specification.

3.2.2 Measured Surface — The measured surface is a representation of the surface obtained by instrumentation or other means.

3.3 Profile — The profile is the contour of a surface in a plane perpendicular to the surface, unless some other angle is specified.

3.3.1 Nominal Profile — The nominal profile is the profile disregarding surface texture.

3.3.2 Measured Profile — The measured profile is a representation of the profile obtained by instrumental or other means. (See FIG. 4.)

3.4 Centerline (Roughness) — The center is the line about which roughness is measured and is a line parallel to the general direction of the profile within the limits of the roughness-width cutoff, such that the sums of the areas contained between it and those parts of the profile which lie on either side of it are equal.[2] [2 Centerline, as defined above, is also known mathematically as the median line.]

3.5 Microinch — One millionth of a linear inch (0.000001 in.). This is the unit of height for roughness. Microinches may be abbreviated as Mu in.

3.6 Roughness — Roughness consists of the finer irregularities in the surface texture usually including those irregularities which result from the inherent action of the production process. These are considered to include traverse feed marks and other irregularities within the limits of the roughness-width cutoff. (See FIG. 5.)

3.7 Waviness — Waviness is the usually widely spaced component of surface texture and is generally of wider spacing than the roughness-width cutoff. Waviness may result from such factors as machine or work reflections, vibration, chatter, heat treatment, or warping strains. Roughness may be considered as superposed on a wavy surface. Their directions are not necessarily related.

3.8 Lay — The direction of the predominant surface pattern, ordinarily determined by the production method used.

3.9 Flaws — Flaws are irregularities which occur at one place or at relatively infrequent or widely varying intervals in a surface. Flaws include such defects as cracks, blow holes, checks, ridges, and scratches. Unless otherwise specified, the effect of flaws shall not be included in the roughness height measurements.

4. Specification and Rating 4.1 Roughness Height Rating — The height of the roughness shall be specified in microinches as the arithmetical average of the absolute deviations from the mean surface. This value will be identified as a roughness number; for example, 16 means that the surface has an arithmetical average absolute deviation from the mean surface of 16 Mu in.[3] [3 Instruments calibrated in rms (root mean square) average will read approximately 11% higher on a given surface than those calibrated for arithmetic average (aa).]

4.2 Roughness Width Rating — The maximum permissible spacing of repetitive units of the dominant surface pattern. It may be specified in inches adjacent to the lay symbol. Irregularities having spacings up to and including the maximum specified are rated as roughness width and are to be included in the measurement of roughness height. When no maximum dimension is specified, spacings up to and including the width of the irregularities due to machine feed are rated as roughness width and are to be included in the measurement of roughness height.

4.3 Roughness-Width Cutoff — The greatest spacing of repetitive surface irregularities to be included in the measurement of average roundness height. Roughness-width cutoff is rated in inches. Roughness-width cutoff must always be greater than the roughness width in order to obtain the total roughness height rating. Standard roughness-width cutoff values (inches) are:

0.003    0.010    0.030    0.100    0.300    1.000

When no value is specified, the value 0.030 is assumed. Refer to SAE J449, Surface Texture Control.

4.4 Waviness Height Rating — Waviness heights may be specified directly in inches as the vertical distance from peaks to valleys of waves.

4.5 Waviness Width Rating — Waviness widths may be specified directly in inches as the distance from peak to peak of the waves.

4.6 Lay Specifications — The lay of a surface shall be specified by the lay symbol indicating direction of dominant visible surface marks.

5. Measurement or Evaluation — For compliance with specified ratings, surfaces are to be evaluated by comparison with specified reference standards or by direct instrument measurements as described below.

5.1 Roughness — Roughness height values may be measured by any acceptable method, for instance, sight, feel, or instrument. For routine measurements, comparison may be made with a master surface that satisfactorily meets the requirements of the surface being measured. In making comparisons care should be exercised to avoid errors due to differences in material, contour, and type of operation represented by the reference surface and the work.

In using instruments for comparison or for direct measurement, care should be exercised to insure that the specified quality or characteristic of the surface is measured.[4] [4 See ASA B46. 1-1962 for instrument specifications.]

Roughness measurements, unless otherwise specified, are taken in the direction which gives the maximum value of the reading normally across the lay.

5.2 Waviness — Waviness values for height and width may be measured by any suitable device for linear measurement.

6. Recommended Values of Roughness and Waviness — The use of only one number shall indicate the maximum value of either the height or the width of irregularities. Any less degree shall be satisfactory. When two numbers are used, they shall specify the maximum and minimum permissible values.

| SAE Roughness Height Values, Mu in. | | | | | | |
|---|---|---|---|---|---|---|
|   | 3 | 8  | 20 | 50  | 125 | 320 | 800 |
|   | 4 | 10 | 25 | 63  | 160 | 400 | 1000 |
| 1 | 5 | 13 | 32 | 80  | 200 | 500 |  |
| 2 | 6 | 16 | 40 | 100 | 250 | 600 |  |

| SAE Waviness Height Values, in. | | | | | |
|---|---|---|---|---|---|
| 0.00002 | 0.00008 | 0.0003 | 0.001 | 0.005 | 0.0.15 |
| 0.00003 | 0.0001  | 0.0005 | 0.002 | 0.008 | 0.020 |
| 0.00005 | 0.0002  | 0.0008 | 0.003 | 0.010 | 0.030 |

To illustrate the increased fatigue life with the present invention, the fatigue lives of three resilient bushings embodying the present invention were compared with corresponding production resilient bushings used in automobile applications. The resilient bushings were similar to the one shown in FIGS. 1 and 2 having an elastomeric insert under radial compression of about 30 to 100% elongation. The Durometer of the natural rubber compound used in the bushings was about 60 Durometer. Failure was established by wearing away of the elastomeric insert until the outer member touched the inner member and made electrical contact therebetween. The results of the tests are tabulated in TABLE I below.

ings of Tests Nos. 3–4; the fatigue lives of the bushings of Tests Nos. 5–8 (rated at 200 Kc) are higher than the fatigue lives of the bushings of Tests Nos. 9–12; and the fatigue lives of the bushings of Tests Nos. 13–17 (rated at 100 Kc) are higher than the fatigue lives of the bushings of Tests Nos. 18–24. The advantage in fatigue life of the present invention over corresponding prior art bushings is clearly demonstrated.

While the presently preferred embodiments of the invention and means of performing them have been specifically described, it is distinctly understood that the invention may be otherwise variously embodied and used within the scope of the following claims.

What is claimed is:

TABLE I

| Test No. | Bushing No. | Surface Preparation of Outer Surface of Inner Member | Roughness-Height of Outer Surface of Inner Member (in RMS) | Fatigue Life Specified (in cycles) | Load (in Pounds) | Total Torsion Angle (Degrees) | Cycles Per Hour | Run Time (in Hours) | Actual Fatigue Life to Failure (in Cycles) |
|---|---|---|---|---|---|---|---|---|---|
| | | | | | on O.M. | on I.M. | | | |
| 1 | 1 | Sandblasted(No. 50 Steel Grit for at least 3 minutes) | 170–260 | — | 2250 | 34 | 16,500 | 79.0 | 1,303,500 |
| 2 | 1 | Sandblasted (No. 50 Steel Grit for at least 3 minutes) | 170–260 | — | 2250 | 34 | 16,500 | 55.4 | 914,100 |
| 3 | 1 | None - Plain Steel | 10–50 | — | 2250 | 34 | 16,500 | 44.4 | 732,600 |
| 4 | 1 | None - Plain Steel | 10–50 | — | 2250 | 34 | 16,500 | 54.0 | 891,000 |
| | | | | | | on O.M. | | | |
| 5 | 2 | Sandblasted(No. 50 Steel Grit for at least 3 minutes) | 170–260 | 200,000 | 470 | 58 | 14,400 | 19.7 | 283,680 |
| 6 | 2 | Sandblasted(No. 50 Steel Grit for at least 3 minutes) | 170–260 | 200,000 | 470 | 58 | 14,400 | 18.2 | 262,080 |
| 7 | 2 | Sandblasted (No. 50 Steel Grit for at least 3 minutes) | 170–260 | 200,000 | 470 | 58 | 14,400 | 14.7 | 216,680 |
| 8 | 2 | Sandblasted (No. 50 Steel Grit for at least 3 minutes) | 170–260 | 200,000 | 470 | 58 | 14,400 | 18.9 | 272,160 |
| 9 | 2 | Phosphate Coating (700–900 mg/ft$^2$) | 20–50 | 200,000 | 470 | 58 | 14,400 | 12.9 | 185,760 |
| 10 | 2 | Phosphate Coating (700–900 mg/ft$^2$) | 20–50 | 200,000 | 470 | 58 | 14,400 | 12.0 | 172,800 |
| 11 | 2 | Phosphate Coating (700–900 mg/ft$^2$) | 20–50 | 200,000 | 470 | 58 | 14,400 | 14.4 | 207,360 |
| 12 | 2 | Phosphate Coating (700–900 mg/ft$^2$) | 20–50 | 200,000 | 470 | 58 | 14,400 | 14.9 | 214,560 |
| | | | | | on I.M. | on O.M. | | | |
| 13 | 3 | Sandblasted(No. 50 Steel Grit for at least 3 minutes) | 130–260 | 100,000 | 1200 | 40 | 16,500 | 16.1 | 265,650 |
| 14 | 3 | Sandblasted(No. 50 Steel Grit for at least 3 minutes) | 130–260 | 100,000 | 1200 | 40 | 16,500 | 27.7 | 457,050 |
| 15 | 3 | Sandblasted(No. 50 Steel Grit for at least 3 minutes) | 120–360 | 100,000 | 1200 | 40 | 16,500 | 23.3 | 384,450 |
| 16 | 3 | Sandblasted(No. 50 Steel Grit for at least 3 minutes) | 120–360 | 100,000 | 1200 | 40 | 16,500 | 32.1 | 529,650 |
| 17 | 3 | Sandblasted(No. 50 Steel Grit for at least 3 minutes) | 120–360 | 100,000 | 1200 | 40 | 16,500 | 22.2 | 366,300 |
| 18 | 3 | Phosphate Coating (700–900 mg/ft$^2$) | 20–50 | 100,000 | 1200 | 40 | 16,500 | 13.5 | 222,750 |
| 19 | 3 | Phosphate Coating (700–900 mg/ft$^2$) | 20–50 | 100,000 | 1200 | 40 | 16,500 | 14.1 | 232,650 |
| 20 | 3 | Phosphate Coating (700–900 mg/ft$^2$) | 20–50 | 100,000 | 1200 | 40 | 16,500 | 7.0 | 115,500 |
| 21 | 3 | Phosphate Coating (700–900 mg/ft$^2$) | 20–50 | 100,000 | 1200 | 40 | 16,500 | 9.5 | 156,750 |
| 22 | 3 | Phosphate Coating (700–900 mg/ft$^2$) | 20–50 | 100,000 | 1200 | 40 | 16,500 | 8.2 | 135,300 |
| 23 | 3 | Phosphate Coating (700–900 mg/ft$^2$) | 20–50 | 100,000 | 1200 | 40 | 16,500 | 7.8 | 128,700 |
| 24 | 3 | Phosphate Coating (700–900 mg/ft$^2$) | 20–50 | 100,000 | 1200 | 40 | 16,500 | 6.5 | 107,250. |

As can be seen from TABLE I, the fatigue life of the resilient bushings embodying the present invention were found to be consistently higher than the fatigue life of the corresponding prior art bushings. Specifically, the fatigue lives of the bushings of Tests Nos. 1–2 (unrated) are higher than the fatigue lives of the bush- 1. A resilient bushing comprising:

an outer rigid member having curvilinear inner surface portions;

an inner rigid member having curvilinear outer surface portions;

at least one of said surface portions being provided as a sandblasted surface with a phosphate coating of selected weight of at least about 2,000 milligrams per square foot formed on said surface to define an effective roughness surface height rating selected between about 170 RMS and 260 RMS in accordance with SAE Standard J448a; and an elastomeric insert compressively positioned between said inner surface portions of the outer member and said outer surface portions of the inner member.

2. A resilient bushing comprising:

an outer rigid member having curvilinear inner surface portions;

an inner rigid member having curvilinear outer surface portions;

at least one of said surface portions being provided as a sandblasted surface with an effective phosphate coating formed on said surface to define an effective roughness surface height rating selected in accordance with SAE Standard J448a; and an elastomeric insert compressively positioned between said inner surface portions of the outer member and said outer surface portions of the inner member.

3. A resilient bushing as set forth in claim 2 wherein at least said outer portions of said inner rigid member is provided to define said roughness surface height rating.

4. A resilient bushing as set forth in claim 2 wherein said roughness height rating is selected to be at least about 170 RMS.

5. A resilient bushing as set forth in claim 2 wherein the weight of said effective phosphate coating is at least about 2,000 milligrams per square foot.

6. A resilient bushing as set forth in claim 2 wherein said roughness height rating is selected between about 170 RMS and 260 RMS.

7. A resilient bushing as set forth in claim 3 wherein said roughness height rating is selected to be at least about 170 RMS.

8. A resilient bushing as set forth in claim 7 wherein the weight of said effective phosphate coating is at least about 2,000 milligrams per square foot.

9. A resilient bushing as set forth in claim 3 wherein said roughness height rating is selected between about 170 RMS and 260 RMS.

10. A resilient bushing as set forth in claim 4 wherein the weight of said effective phosphate coating is at least about 2,000 milligrams per square foot.

11. A resilient bushing as set forth in claim 5 wherein said roughness height rating is selected between about 170 RMS and 260 RMS.

12. A resilient bushing as set forth in claim 11 wherein at least said outer portions of said inner rigid member is provided to define said roughness surface height rating.

13. A resilient bushing as set forth in claim 1 wherein:

at least said outer surface portions of the inner rigid member have said surface roughness height rating.

* * * * *